Patented Apr. 21, 1931

1,801,461

UNITED STATES PATENT OFFICE

IAN C. SOMERVILLE, OF CHELTENHAM, PENNSYLVANIA, ASSIGNOR TO ROHM & HAAS COMPANY, A CORPORATION OF DELAWARE

SULPHONATION PRODUCT

No Drawing.   Application filed August 10, 1929.   Serial No. 385,078.

Synthetic tanning agents have long been prepared by condensation of aromatic compounds by means of aldehydes, and converting to water-soluble products by sulphonation. In some cases the materials, such as phenol, are first condensed to a resin, and then sulphonated; in others the sulphonic acids are first prepared, and these are subsequently condensed with aldehydes.

In an analogous fashion I have now prepared materials with properties of converting raw hides into pelt by using ketones in place of aldehydes, in reactions similar to those outlined above. These may be made by direct condensation of the sulphonic acids with the ketone, combining approximately two molecules of aromatic sulphonic acid to one molecule of ketone. I prefer, however, to first condense the hydrocarbon nucleus with the ketone, isolating the diaryl dialkylmethane which is ordinarily produced, and a number of which are well known chemical compounds, and subsequently to sulphonate this product to form a water-soluble material with valuable tanning properties.

This reaction is not confined to simple ketones such as acetone in which only alkyl groups are attached to the carbonyl group. It can be carried out with such products as dibenzyl ketone, or even with closed chain ketones such as cyclohexanone.

Sulphonic acids produced by this type of reaction possess the power of precipitating gelatine and converting pelt into leather.

This invention is illustrated by the following examples but is in no way confined to these examples.

Example I 4,4'-dihydroxy-diphenyl-dimethyl-methane is prepared substantially as described in Beilstein Band VI p. 1011, namely: A mixture of 210 grams phenol, 30 grams acetone, and 21 grams of concentrated hydrochloric acid is warmed at 40° C. for 2–3 days, then poured into 300 cc. of 40% acetic acid. The product, which separates as a white solid, is purified by recrystallization from water or dilute acetic acid, until it shows a melting point of 151–154° C.

228 grams of this product are sulphonated with 280 grams of sulphuric acid (66° Bé.) by heating at 70° C. for 5 hours. The excess of sulphuric acid is neutralized, the solution obtained diluted and used directly in tanning.

Example II 96 grams napthalene are sulphonated with 98 grams of 100% sulphuric acid by heating to 130° C. for 6 hours. 90 grams of sulphuric acid (66° Bé.) are added and the mixture cooled to 60° C. 90 grams acetone are added through a reflux condenser over a period of 4 hours. At the end of this period the temperature is raised to 95° C. for 1 hour. The mixture is now cooled, diluted with water and the excess of sulphuric acid neutralized. The solution obtained is diluted and may be used directly in tanning.

Having now demonstrated my invention and the manner in which it is to be carried out I claim:

1. As new products the sulphonic acid derivatives of compounds of the type of two aromatic nuclei linked by a carbon atom which is itself connected to two other carbon atoms.

2. As new products those formed by sulphonation of compounds of the type of two aromatic nuclei, of the class consisting of phenol and homologues of phenol, linked by a carbon atom which is itself connected to two other carbon atoms.

3. As new products those formed by sulphonation of compounds of the type of two phenol nuclei linked by a carbon atom which is itself connected to two other carbon atoms.

4. As new products those formed by introducing at least one sulphonic group into a diaryldialkylmethane.

5. As a new product that formed by sulphonation of 4,4'-dihydroxy-diphenyl-dimethyl-methane.

6. As a new product that formed by sulphonation of 1,1-di-(4-hydroxy-phenyl)-cyclohexane.

IAN C. SOMERVILLE.